(12) United States Patent
Togashi (10) Patent No.: US 7,952,852 B2
(45) Date of Patent: May 31, 2011

(54) THROUGH-TYPE MULTILAYER CAPACITOR ARRAY

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 311 days.

(21) Appl. No.: 12/339,463

(22) Filed: Dec. 19, 2008

(65) Prior Publication Data

US 2009/0168296 A1 Jul. 2, 2009

(30) Foreign Application Priority Data

Dec. 28, 2007 (JP) ................................ P2007-340447

(51) Int. Cl.
*H01G 4/005* (2006.01)
*H01G 4/06* (2006.01)
(52) U.S. Cl. ........................................ 361/303; 361/311
(58) Field of Classification Search .......... 361/303–305, 361/306.1, 306.2, 306.3, 309, 311
See application file for complete search history.

(56) References Cited

U.S. PATENT DOCUMENTS

| 6,768,630 | B2 * | 7/2004 | Togashi | ..................... | 361/306.1 |
| 7,145,429 | B1 | 12/2006 | Togashi et al. | | |
| 7,433,172 | B2 | 10/2008 | Togashi | | |
| 2003/0227738 | A1 | 12/2003 | Togashi | | |
| 2005/0046516 | A1 | 3/2005 | Togashi | | |

FOREIGN PATENT DOCUMENTS

| CN | 1469402 A | 1/2004 |
| CN | 1832072 A | 9/2006 |
| JP | A-01-206615 | 8/1989 |
| JP | A-9-93069 | 4/1997 |
| JP | A-2004-14961 | 1/2004 |
| JP | A-2005-79756 | 3/2005 |
| JP | A-2006-253419 | 9/2006 |
| JP | A-2007-201467 | 8/2007 |

* cited by examiner

*Primary Examiner* — Eric Thomas
(74) *Attorney, Agent, or Firm* — Oliff & Berridge, PLC (57) ABSTRACT

A multilayer capacitor array includes a capacitor body, two first signal terminal electrodes, two second signal terminal electrodes, two grounding terminal electrodes, one first outer connecting conductor, and one second outer connecting conductor, where the capacitor body includes first and second signal inner electrodes, and first to third grounding inner electrodes. The first signal inner electrode is arranged to oppose the first or third grounding inner electrode with at least one insulator layer therebetween, while the second signal inner electrode is arranged to oppose the second or third grounding inner electrode with at least one insulator layer therebetween. The third grounding inner electrode is directly connected to the grounding terminal electrodes, while the first and second grounding inner electrodes are not directly connected to the grounding terminal electrodes, but are connected to the third grounding inner electrode through respective outer connecting conductors.

3 Claims, 7 Drawing Sheets

Fig.7

# THROUGH-TYPE MULTILAYER CAPACITOR ARRAY

BACKGROUND OF THE INVENTION

1. Field of the Invention

The present invention relates to a through-type multilayer capacitor array.

2. Related Background Art

Known as this kind of through-type multilayer capacitor is one comprising a capacitor body in which insulator layers are alternately laminated with signal inner electrodes and grounding inner electrodes, and signal terminal electrodes and grounding terminal electrodes formed on the capacitor body (see, for example, Japanese Patent Application Laid-Open No. 01-206615).

On the other hand, power supplies for central processing units (CPUs) mounted in digital electronic devices have been lowering their voltage while increasing their load current. This has made it very difficult for fluctuations in power voltage to be held below a tolerable level, whereby a multilayer capacitor known as decoupling capacitor has come into connection with the power supplies. When the load current fluctuates transiently, a current is supplied from this multilayer capacitor to the CPUs, so as to suppress the fluctuation in the power supply voltage.

Recently, as the CPUs have been further raising their frequency, the load current has been becoming faster and greater, whereby the multilayer capacitor used for the decoupling capacitor has been demanded to increase its capacity and equivalent series resistance (ESR).

SUMMARY OF THE INVENTION

However, the through-type multilayer capacitor described in Japanese Patent Application Laid-Open No. 01-206615 has no consideration for increasing the equivalent series resistance. Further, all the inner electrodes are directly connected to terminal electrodes in the through-type multilayer capacitor described in Japanese Patent Application Laid-Open No. 01-206615. Therefore, increasing the number of laminated layers in order to respond to a greater capacity decreases the equivalent series resistance in the above-mentioned through-type multilayer capacitor.

It is an object of the present invention to provide a through-type multilayer capacitor which can increase the equivalent series resistance.

Meanwhile, in a typical through-type multilayer capacitor array, all the inner electrodes are connected to their corresponding terminal electrodes through lead parts. Therefore, the lead parts connected to the terminal electrodes exist by the number of inner electrodes, thereby lowering the equivalent series resistance. When the number of laminations of insulator layers and inner electrodes is increased in order to achieve a greater capacity in each capacitor of the through-type multilayer capacitor array, the number of lead parts also increases. Since the resistance components of lead parts connected to terminal electrodes are connected in parallel to the terminal electrodes, the equivalent series resistance of the through-type multilayer capacitor array further decreases as the number of lead parts connected to the terminal electrodes increases. Hence, increasing the capacity of the through-type multilayer capacitor array and enhancing the equivalent series resistance therein are conflicting demands.

Therefore, the inventors conducted diligent studies about a through-type multilayer capacitor array which can satisfy the demands for increasing the capacity and enhancing the equivalent series resistance. As a result, the inventors have found a new fact that, even when the number of laminations of insulator layers and inner electrodes is held constant, the equivalent series resistance can be adjusted to a desirable value if the inner electrodes can be connected to an external connecting conductor formed on a surface of a capacitor body while changing the number of lead parts. The inventors have also found a new fact that the equivalent series resistance can be adjusted to a desirable value if the inner electrodes can be connected with an external connecting conductor formed on a surface of a capacitor body while changing a position of a lead part in the laminating direction of the capacitor body. In particular, the equivalent series resistance can be adjusted so as to become greater if the number of lead parts is made smaller than that of inner electrodes.

In view of such results of studies, the through-type multilayer capacitor array in accordance with the present invention comprises a capacitor body, at least two first signal terminal electrodes arranged on an outer surface of the capacitor body, at least two second signal terminal electrodes arranged on the outer surface of the capacitor body, at least two grounding terminal electrodes arranged on the outer surface of the capacitor body, at least one first outer connecting conductor arranged on the outer surface of the capacitor body, and at least one second outer connecting conductor arranged on the outer surface of the capacitor body; wherein the capacitor body includes a plurality of laminated insulator layers, a first signal inner electrode, a second signal inner electrode, a first grounding inner electrode, a second grounding inner electrode, and a third grounding inner electrode; wherein the first signal inner electrode is arranged so as to oppose the first or third grounding inner electrode with at least one of the plurality of insulator layers in between; wherein the second signal inner electrode is arranged so as to oppose the second or third grounding inner electrode with at least one of the plurality of insulator layers in between; wherein the first signal inner electrode is connected to the at least two first signal terminal electrodes; wherein the second signal inner electrode is connected to the at least two second signal terminal electrodes; wherein the first grounding inner electrode is connected to the at least one first outer connecting conductor; wherein the second grounding inner electrode is connected to the at least one second outer connecting conductor; and wherein the third grounding inner electrode is connected to the at least two grounding terminal electrodes, the at least one first outer connecting conductor, and the at least one second outer connecting conductor.

In the above-mentioned through-type multilayer capacitor, the grounding inner electrodes include the third grounding inner electrode connected to the grounding terminal electrodes, the first grounding inner electrode indirectly connected to the grounding terminal electrodes through the first outer connecting conductor, and the second grounding inner electrode indirectly connected to the grounding terminal electrodes through the second outer connecting conductor. Therefore, this through-type multilayer capacitor can make the equivalent series resistance greater than in the case where all the grounding inner electrodes are connected to the grounding terminal electrodes.

In this case, the at least two first signal terminal electrodes may be arranged at least one by one on a pair of opposing side faces of the capacitor body, the at least two second signal terminal electrodes may be arranged at least one by one on the pair of opposing side faces of the capacitor body, and the at least two grounding terminal electrodes may be arranged at least one by one on a pair of opposing side faces of the capacitor body.

Preferably, the first and second signal inner electrodes are arranged at the same position in the laminating direction of the insulator layers within the capacitor body, while the first and second grounding inner electrodes are arranged at the same position in the laminating direction of the insulator layers within the capacitor body. This allows the through-type multilayer capacitor array to lower its profile.

The present invention can provide a through-type multilayer capacitor which can increase the equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from is detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same reference characters while omitting their overlapping descriptions.

First Embodiment

Figure 1:
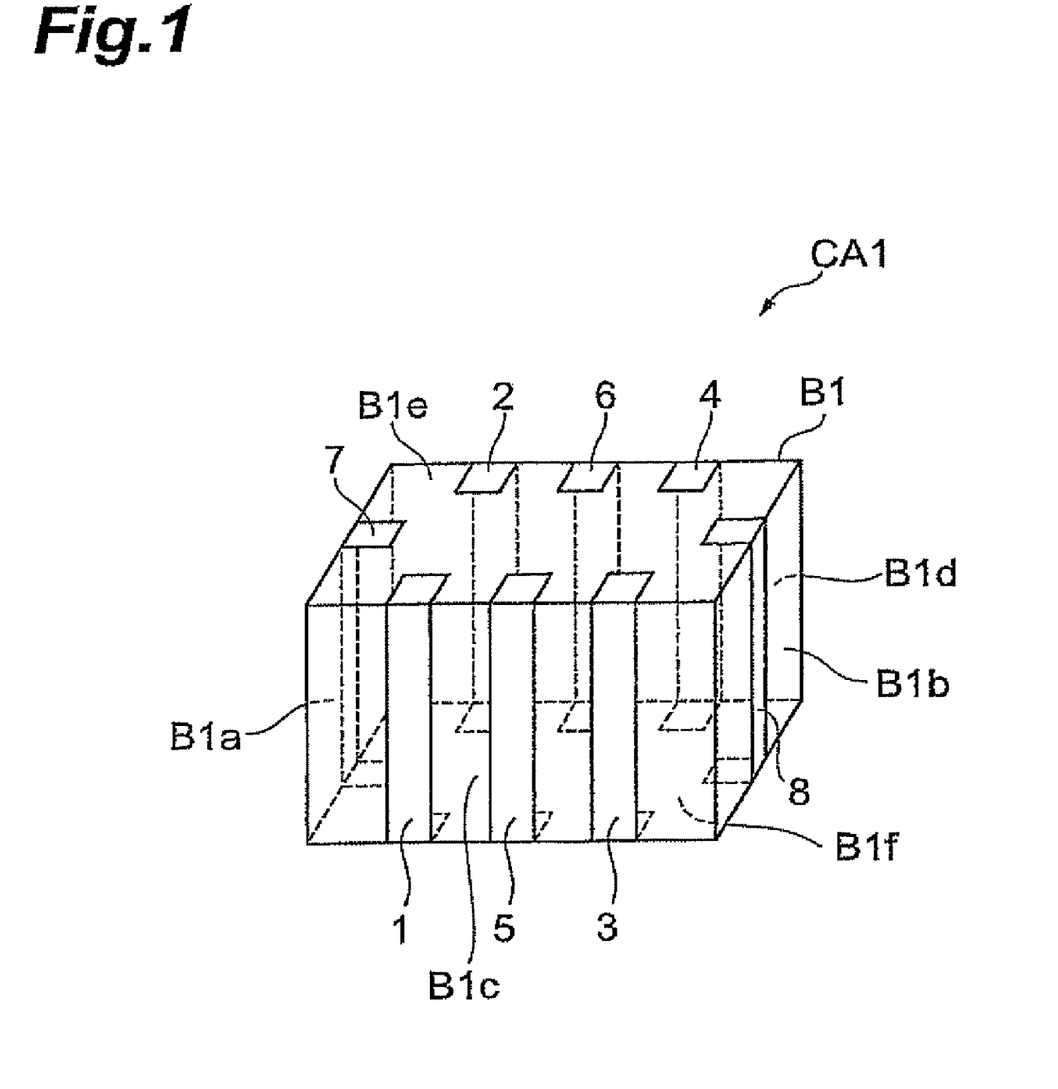
FIG. 1 is a perspective view of the through-type multilayer capacitor array in accordance with a first embodiment.
Figure 2:
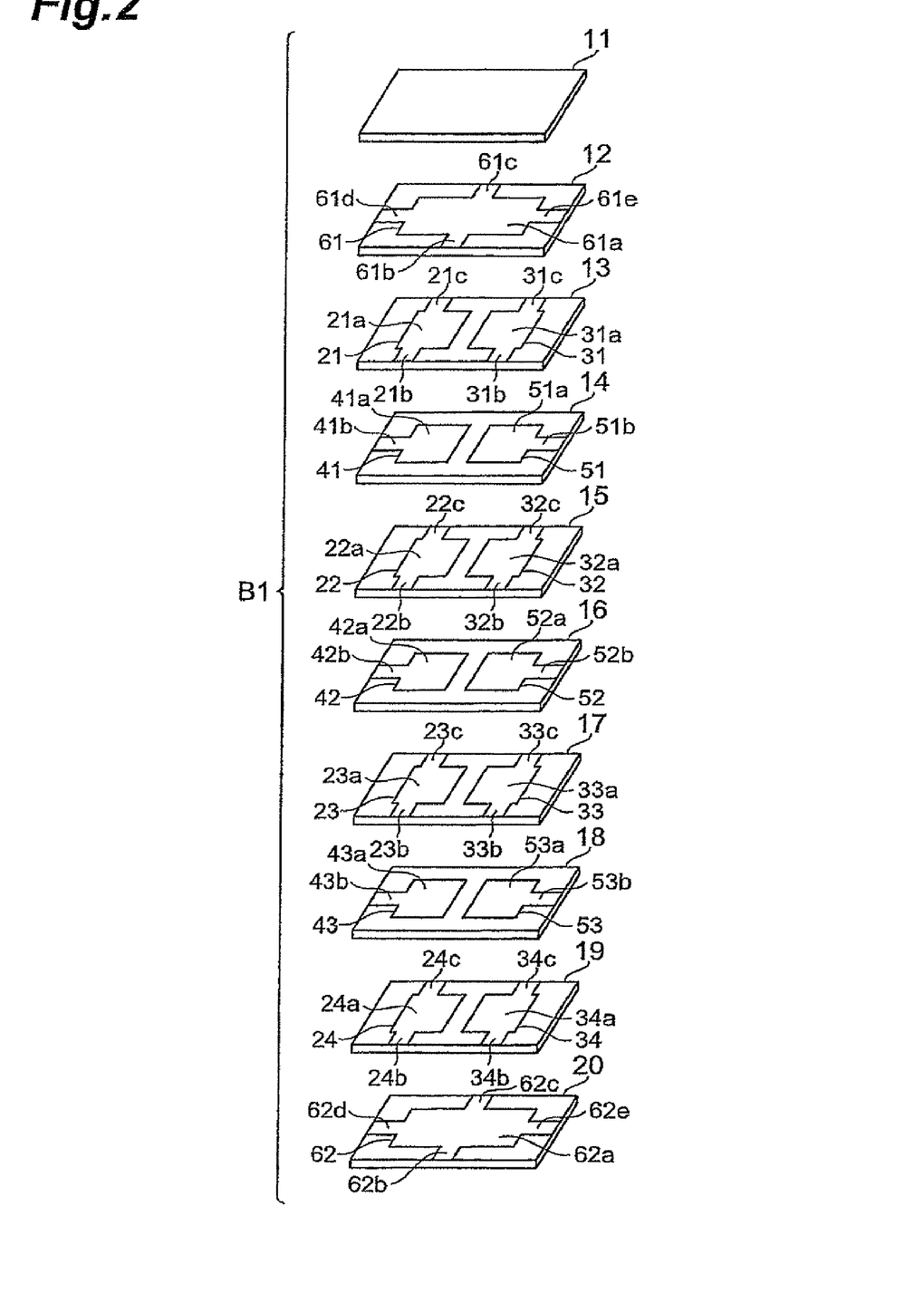
FIG. 2 is an exploded perspective view of a capacitor body included in the through-type multilayer capacitor array in accordance with the first embodiment.

The structure of the through-type multilayer capacitor array CA1 in accordance with the first embodiment will now be explained with reference to FIGS. 1 and 2. FIG. 1 is a perspective view of the through-type multilayer capacitor array in accordance with the first embodiment. FIG. 2 is an exploded perspective view of a capacitor body included in the through-type multilayer capacitor array in accordance with the first embodiment.

As shown in FIG. 1, the through-type multilayer capacitor array CA1 in accordance with the first embodiment comprises a capacitor body B1, and first signal terminal electrodes 1, 2, second signal terminal electrodes 3, 4, grounding terminal electrodes 5, 6, a first outer connecting conductor 7, and a second outer connecting conductor 8 which are arranged on outer surfaces of the capacitor body B1. The through-type multilayer capacitor array CA1 can be used as a noise filter for preventing noises from leaking or entering through leads for signals and the like, for example.

The first and second signal terminal electrodes 1 to 4, grounding terminal electrodes 5, 6, and first and second outer connecting conductors 7, 8 are formed by applying and burning a conductive paste containing a conductive metal powder and glass frit onto their corresponding outer surfaces of the capacitor body, for example. Plating layers may be formed on the burned terminal electrodes and outer connecting conductors when necessary. The first and second signal terminal electrodes 1 to 4, grounding terminal electrodes 5, 6, and first and second outer connecting conductors 7, 8 are formed such as to be electrically insulated from each other on the surfaces of the capacitor body B1.

As shown in FIG. 1, the capacitor body B1 is shaped like a rectangular parallelepiped and has oblong first and second main faces B1$e$, B1$f$ opposing each other, first and second end faces B1$a$, B1$b$ extending in the shorter side direction of the first and second main faces B1$e$, B1$f$ so as to connect them to each other while opposing each other, and first and second side faces B1$c$, B1$d$ extending in the longer side direction of the first and second main faces B1$e$, B1$f$ so as to connect them to each other while opposing each other.

The first signal terminal electrodes 1, 2 are arranged one by one on the opposing first and second side faces B1$c$, B1$d$ of the capacitor body B1. The first signal terminal electrode 1 is arranged on the first side face B1$c$ of the capacitor body B1. On the other hand, the first signal terminal electrode 2 is arranged on the second side face B1$d$ of the capacitor body B1 opposing the first side face B1$c$. The first signal terminal electrodes 1, 2 oppose each other in the opposing direction of the first and second side faces B1$c$, B1$d$.

The second signal terminal electrodes 3, 4 are arranged one by one on the opposing first and second side faces B1$c$, B1$d$ of the capacitor body B1. The second signal terminal electrode 3 is arranged on the first side face B1$c$ of the capacitor body B1. On the other hand, the second signal terminal electrode 4 is arranged on the second side face B1$d$ of the capacitor body B1 opposing the first side face B1$c$. The second signal terminal electrodes 3, 4 oppose each other in the opposing direction of the first and second side faces B1$c$, B1$d$.

The grounding terminal electrodes 5, 6 are arranged one by one on the opposing first and second side faces B1$c$, B1$d$ of the capacitor body B1. The grounding terminal electrode 5 is arranged on the first side face B1$c$ of the capacitor body B1. On the other hand, the grounding terminal electrode 6 is arranged on the second side face B1$d$ of the capacitor body B1 opposing the first side face B1$c$. The grounding terminal electrodes 5, 6 oppose each other in the opposing direction of the first and second side faces B1$c$, B1$d$.

The first and second signal terminal electrodes 1, 3 and grounding terminal electrode 5 are arranged on the first side face B1$c$ of the capacitor body B1 in the order of the first signal terminal electrode 1, grounding terminal electrode 5, and second signal terminal electrode 3 in the direction from the first end face B1$a$ to the second end face B1$b$. The first and second signal terminal electrodes 2, 4 and grounding terminal electrode 6 are arranged on the second side face B1$d$ of the capacitor body B1 in the order of the first signal terminal electrode 2, grounding terminal electrode 6, and second signal terminal electrode 4 in the direction from the first end face B1a to the second end face B1b.

The first outer connecting conductor 7 is arranged on the first end face B1a of the capacitor body B1. The second outer connecting conductor 8 is arranged on the second end face B1b of the capacitor body B1.

As shown in FIG. 2, the capacitor body B1 is constructed by laminating a plurality of (10 in this embodiment) insulator layers 11 to 20. Each of the insulator layers 11 to 20 is constituted by a sintered body of a ceramic green sheet containing a dielectric ceramic, for example. The laminating direction of the insulator layers 11 to 20 in the capacitor body B1 will simply be referred to as "laminating direction" in the following. In the actual multilayer capacitor array CA1, the insulator layers 11 to 20 are integrated to such an extent that their boundaries are indiscernible.

The capacitor body B1 includes therewithin first signal inner electrodes 21 to 24, second signal inner electrodes 31 to 34, first grounding inner electrodes 41 to 43, second grounding inner electrodes 51 to 53, and third grounding inner electrodes 61, 62.

The first and second signal inner electrodes 21 to 24, 31 to 34 include rectangular main electrode parts 21a to 24a, 31a to 34a, respectively. The main electrode parts 21a to 24a, 31a to 34a are arranged such that their sides are parallel to the longer or shorter side direction of the first and second main faces B1e, B1f of the capacitor body B1.

The first signal inner electrodes 21 to 24 further include lead parts 21b to 24b extending from the main electrode parts 21a to 24a to the first side face B1c and lead parts 21c to 24c extending from the main electrode parts 21a to 24a to the second side face B1d. Each of the lead parts 21b to 24b is connected to the first signal terminal electrode 1. Each of the lead parts 21c to 24c is connected to the first signal terminal electrode 2. Hence, each of the first signal inner electrodes 21 to 24 is connected to two first signal terminal electrodes 1, 2.

The second signal inner electrodes 31 to 34 further include lead parts 31b to 34b extending from the main electrode parts 31a to 34a to the first side face B1c and lead parts 31c to 34c extending from the main electrode parts 31a to 34a to the second side face B1d. Each of the lead parts 31b to 34b is connected to the second signal terminal electrode 3. Each of the lead parts 31c to 34c is connected to the second signal terminal electrode 4. Hence, each of the second signal inner electrodes 31 to 34 is connected to two second signal terminal electrodes 3, 4.

The first to third grounding inner electrodes 41 to 43, 51 to 53, 61, 62 include rectangular main electrode parts 41a to 43a, 51a to 53a, 61a, 62a, respectively. The main electrode parts 41a to 43a, 51a to 53a, 61a 62a are arranged such that their sides are parallel to the longer or shorter side direction of the first and second main faces B1e, B1f of the capacitor body B1.

The first grounding inner electrodes 41 to 43 further include lead parts 41b to 43b extending from the main electrode parts 41a to 43a to the first end face B1a. Each of the lead parts 41b to 43b is connected to the first outer connecting conductor 7. Hence, each of the first grounding inner electrodes 41 to 43 is connected to the first outer connecting conductor 7.

The second grounding inner electrodes 51 to 53 further include lead parts 51b to 53b extending from the main electrode parts 51a to 53a to the second end face B1b. Each of the lead parts 51b to 53b is connected to the second outer connecting conductor 8. Hence, each of the second grounding inner electrodes 51 to 53 is connected to the second outer connecting conductor 8.

The third grounding inner electrodes 61, 62 further include lead parts 61b, 62b extending from the main electrode parts 61a, 62a to the first side face B1c, lead parts 61c, 62c extending from the main electrode parts 61a, 62a to the second side face B1d, lead parts 61d, 62d extending from the main electrode parts 61a, 62a to the first end face B1a, and lead parts 61e, 62e extending from the main electrode parts 61a, 62a to the second end face B1b. Each of the lead parts 61b, 62b is connected to the grounding terminal electrode 5. Each of the lead parts 61c, 62c is connected to the grounding terminal electrode 6. Each of the lead parts 61d, 62d is connected to the first outer connecting conductor 7. Each of the lead parts 61e, 62e is connected to the second outer connecting conductor 8. Hence, each of the third grounding inner electrodes 61, 62 is connected to the grounding terminal electrodes 5, 6 and first and second outer connecting conductors 7, 8.

The first and second signal inner electrodes 21, 31 are arranged at the same position in the laminating direction within the capacitor body B1. The first and second signal inner electrodes 22, 32 are arranged at the same position in the laminating direction within the capacitor body B1. The first and second signal inner electrodes 23, 33 are arranged at the same position in the laminating direction within the capacitor body B1. The first and second signal inner electrodes 24, 34 are arranged at the same position in the laminating direction within the capacitor body B1.

The first and second grounding inner electrodes 41, 51 are arranged at the same position in the laminating direction within the capacitor body B1. The first and second grounding inner electrodes 42, 52 are arranged at the same position in the laminating direction within the capacitor body B1. The first and second grounding inner electrodes 43, 53 are arranged at the same position in the laminating direction within the capacitor body B1.

Each of the first signal inner electrodes 21 to 24 is arranged such as to oppose the first grounding inner electrode 41 to 43 or third grounding inner electrode 61, 62 through at least one of a plurality of insulator layers 12 to 19.

Specifically, the main electrode part 21a of the first signal inner electrode 21 opposes the main electrode part 61a of the third grounding inner electrode 61 through the insulator layer 12. The main electrode part 21a of the first signal inner electrode 21 also opposes file main electrode part 41a of the first grounding inner electrode 41 through the insulator layer 13.

The main electrode part 22a of the first signal inner electrode 22 opposes the main electrode part 41a of the first grounding inner electrode 41 through the insulator layer 14. The main electrode part 22a of the first signal inner electrode 22 also opposes the main electrode part 42a of the first grounding inner electrode 42 through the insulator layer 15.

The main electrode part 23a of the first signal inner electrode 23 opposes the main electrode part 42a of the first grounding inner electrode 42 through the insulator layer 16. The main electrode part 23a of the first signal inner electrode 23 also opposes the main electrode part 43a of the first grounding inner electrode 43 through the insulator layer 17.

The main electrode part 24a of the first signal inner electrode 24 opposes the main electrode part 43a of the first grounding inner electrode 43 through the insulator layer 18. The main electrode part 24a of the first signal inner electrode 24 also opposes the main electrode part 62a of the third grounding inner electrode 62 through the insulator layer 19.

Each of the second signal inner electrodes 31 to 34 is arranged such as to oppose the second grounding inner electrode 51 to 53 or third grounding inner electrode 61, 62 through at least one of a plurality of insulator layers 12 to 19.

Specifically, the main electrode part 31a of the second signal inner electrode 31 opposes the main electrode part 61a of the third grounding inner electrode 61 through the insulator layer 12. The main electrode part 31a of the second signal inner electrode 31 also opposes the main electrode part 51a of the second grounding inner electrode 51 through the insulator layer 13.

The main electrode part 32a of the second signal inner electrode 32 opposes the main electrode part 51a of the second grounding inner electrode 51 tough the insulator layer 14. The main electrode part 32a of the second signal inner electrode 32 also opposes the main electrode part 52a of the second grounding inner electrode 52 through the insulator layer 15.

The main electrode part 33a of the second signal inner electrode 33 opposes the main electrode part 52a of the second grounding inner electrode 52 through the insulator layer 16. The main electrode part 33a of the second signal inner electrode 33 also opposes the main electrode part 53a of the second grounding inner electrode 53 through the insulator layer 17.

The main electrode part 34a of the second signal inner electrode 34 opposes the main electrode part 53a of the second grounding inner electrode 53 through the insulator layer 18. The main electrode part 34a of the second signal inner electrode 34 also opposes the main electrode part 62a of the third grounding inner electrode 62 through the insulator layer 19.

Each of the first signal inner electrodes 21 to 24 is arranged on the first end face B1a side of the capacitor body B1. Each of the second signal inner electrodes 31 to 34 is arranged on the second end face B1b side of the capacitor body B1. The first and second signal inner electrodes 21 to 24, 31 to 34 are arranged in pairs aligning in the opposing direction of the first and second end faces B1a, B1b, while having no overlapping areas therebetween in the laminating direction.

Figure 3:
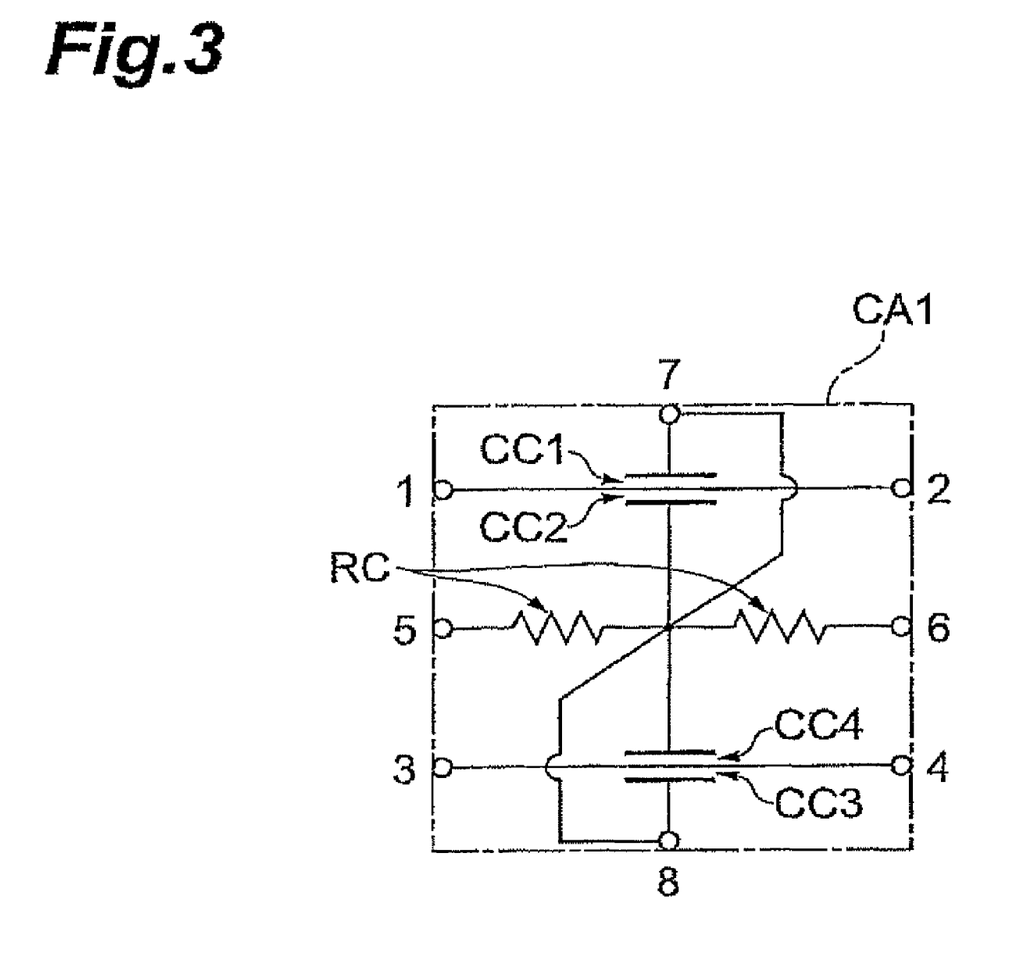
FIG. 3 is an equivalent circuit diagram of the through-type multilayer capacitor array in accordance with the first embodiment.

In thus constructed through-type multilayer capacitor array CA1, capacity components CC1 to CC4 and a resistance component RC are formed as shown in FIG. 3. In this case, the first and second signal terminal electrodes 1 to 4 are connected to signal leads, the grounding terminal electrodes 5, 6 are connected to grounding leads, and the outer connecting conductors 7, 8 are directly connected to none of the signal leads and grounding leads. FIG. 3 is an equivalent circuit diagram of the through-type multilayer capacitor array in accordance with this embodiment.

The main electrode parts 21a to 24a of the first signal inner electrodes 21 to 24 oppose their corresponding main electrode parts 41a to 43a of the first grounding inner electrodes 41 to 43 through the insulator layers 13 to 18. This forms the capacity component CC1 having a predetermined capacitance.

The main electrode parts 21a, 24a of the first signal inner electrodes 21, 24 oppose the main electrode parts 61a, 62a of the third grounding inner electrodes 61, 62 through the insulator layers 12, 19, respectively. This forms the capacity component CC2 having a predetermined capacitance.

The main electrode parts 31a to 34a of the second signal inner electrodes 31 to 34 oppose their corresponding main electrode parts 51a to 53a of the second grounding inner electrodes 51 to 53 through the insulator layers 13 to 18. This forms the capacity component CC3 having a predetermined capacitance.

The main electrode parts 31a, 34a of the second signal inner electrodes 31, 34 oppose the main electrode parts 61a, 62a of the third grounding inner electrodes 61, 62 through the insulator layers 12, 19, respectively. This forms the capacity component CC4 having a predetermined capacitance.

In the through-type multilayer capacitor array CA1, only the third grounding inner electrodes 61, 62 are directly connected to the grounding terminal electrodes 5, 6, the first grounding inner electrodes 41 to 43 are connected to the grounding terminal electrodes 5, 6 through the third grounding inner electrodes 61, 62 and first outer connecting conductor 7, and the second grounding inner electrodes 51 to 53 are connected to the grounding terminal electrodes 5, 6 through the third grounding inner electrodes 61, 62 and second outer connecting conductor 8. Therefore, the resistance component RC obtained by connecting the first grounding inner electrodes 41 to 43 through the first outer connecting conductor 7 and connecting the second inner electrodes 51 to 53 through the second outer connecting conductor 8 is connected in series with the capacity components CC1 to CC4 in the through-type multilayer capacitor array CA1 on the sides of the grounding terminal electrodes 5, 6.

As grounding inner electrodes, the through-type multilayer capacitor array CA1 includes the first and second grounding inner electrodes 41 to 43, 51 to 53, which are not directly connected to the grounding terminal electrodes 5, 6, and the third grounding inner electrodes 61, 62, which are directly connected to the grounding terminal electrodes 5, 6. When attention is focused on the grounding terminal electrode 5, the resistance components of the first and second outer connecting conductors 7, 8 are connected in series with the grounding terminal electrode 5. When attention is focused on the grounding terminal electrode 6, the resistance components of the first and second outer connecting conductors 7, 8 are connected in series with the grounding terminal electrode 6. These make the equivalent series resistance greater in the through-type multilayer capacitor array CA1 than in a conventional through-type multilayer capacitor array in which all the grounding inner electrodes are connected to the grounding terminal electrodes through lead parts. Enhancing the equivalent series resistance prevents the impedance from dropping drastically at a resonance frequency and thus enables a broader band.

As in the foregoing, this embodiment sets the equivalent series resistance of the through-type multilayer capacitor array CA1 to a desirable value by adjusting one or both of the number and position of the third grounding inner electrodes 61, 62 connected to the grounding terminal electrodes 5, 6 through lead parts, whereby the equivalent series resistance can be controlled easily and accurately.

Even when the number of laminations of inner electrodes is increased so as to attain a greater capacitance corresponding to the demand for a larger capacity, the equivalent series resistance is kept from decreasing in the through-type multilayer capacitor array CA1.

In this embodiment, the first signal terminal electrodes 1, 2 are arranged one by one on the opposing first and second side faces B1c, B1d of the capacitor body B1 such as to oppose each other in the opposing direction of the first and second side faces B1c, B1d. The second signal terminal electrodes 3, 4 are arranged one by one on the opposing first and second side faces B1c, B1d of the capacitor body B1 such as to oppose each other in the opposing direction of the first and second side faces B1c, B1d. The grounding terminal electrodes 5, 6 are arranged one by one on the opposing first and second side faces B1c, B1d of the capacitor body B1 such as to oppose each other in the opposing direction of the first and second side faces B1c, B1d.

For example, this makes it easy to connect the first signal terminal electrodes 1, 2 to linear signal leads, the second signal terminal electrodes 3, 4 to linear signal leads, and the grounding terminal electrodes 5, 6 to linear grounding leads, whereby the through-type multilayer capacitor array CA1 can be mounted easily.

In the through-type multilayer capacitor array CA1, the respective pairs of first and second signal inner electrodes 21, 31; 22, 32; 23, 33; 24, 34 and first and second grounding inner electrodes 41, 51; 42, 52; 43, 53 are arranged at the same positions in the laminating direction within the capacitor body B1.

Therefore, in the case where the first and second signal terminal electrodes 1, 4 are connected to the input side while the first and second signal terminal electrodes 2, 3 are connected to the output side, for example, causing currents to flow simultaneously through both of a signal lead connected to the first signal terminal electrodes 1, 2 and a signal lead connected to the second signal terminal electrodes 3, 4 can direct the currents opposite from each other through the respective inner electrodes arranged at the same position in the laminating direction.

Specifically, the direction of the current flowing through the first signal inner electrode 21 and the direction of the current flowing through the second signal inner electrode 31 can be made opposite from each other. The direction of the current flowing through the first signal inner electrode 22 and the direction of the current flowing through the second signal inner electrode 32 can be made opposite from each other. The direction of the current flowing through the first signal inner electrode 23 and the direction of the current flowing through the second signal inner electrode 33 can be made opposite from each other. The direction of the current flowing through the first signal inner electrode 24 and the direction of the current flowing through the second signal inner electrode 34 can be made opposite from each other.

As a result magnetic fields caused by the currents flowing through these signal inner electrodes cancel each other out in the through-type multilayer capacitor array CA1 in accordance with this embodiment, whereby the equivalent series inductance can be lowered.

Since the respective pairs of first and second signal inner electrodes 21, 31; 22, 32; 23, 33; 24, 34 and first and second grounding inner electrodes 41, 51; 42, 52; 43, 53 are arranged at the same positions in the laminating direction wit the capacitor body B1, the through-type multilayer capacitor array CA1 allows the device to lower its profile.

Second Embodiment

Figure 4:
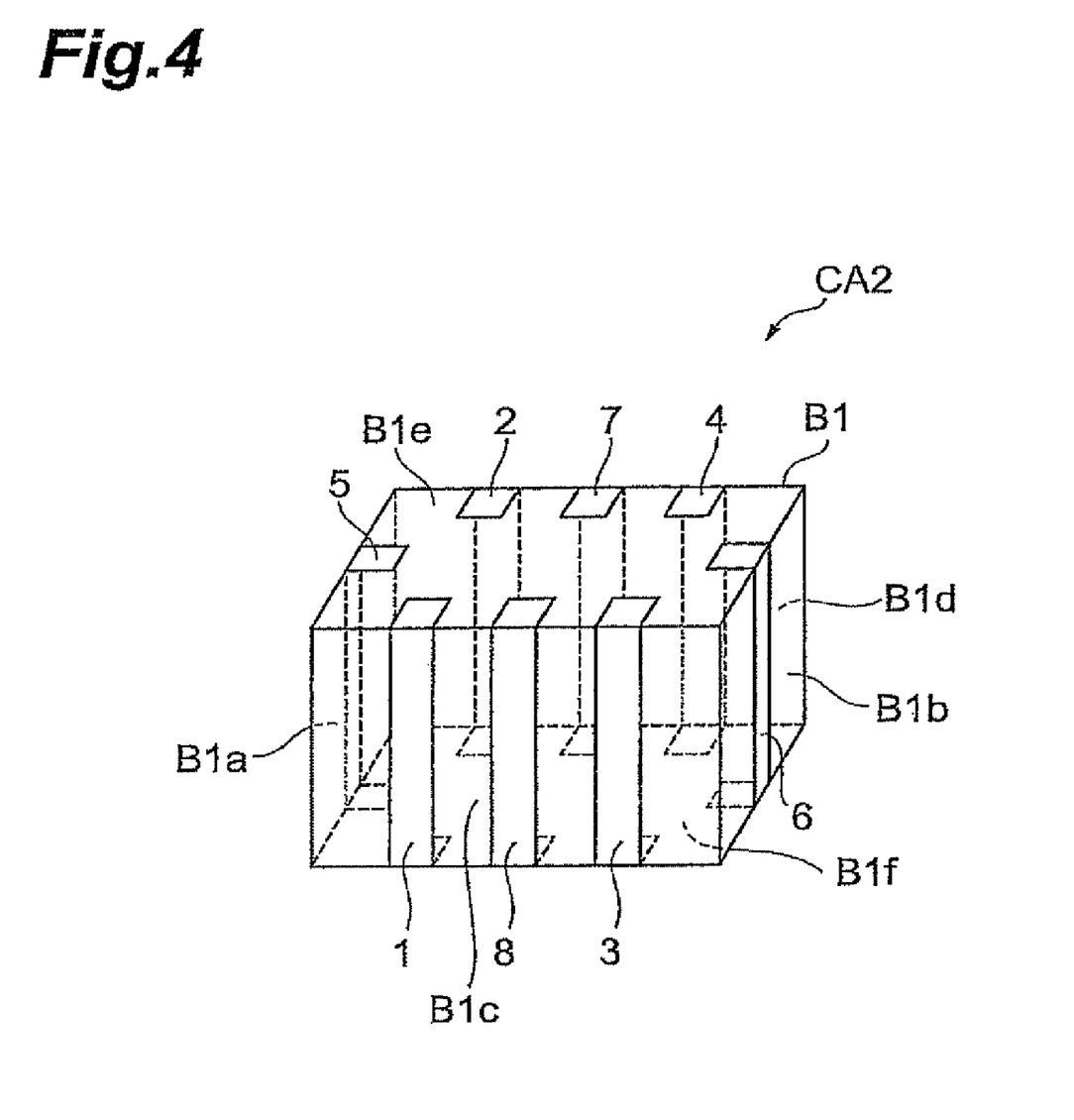
FIG. 4 is a perspective view of the through-type multilayer capacitor array in accordance with a second embodiment.
Figure 5:
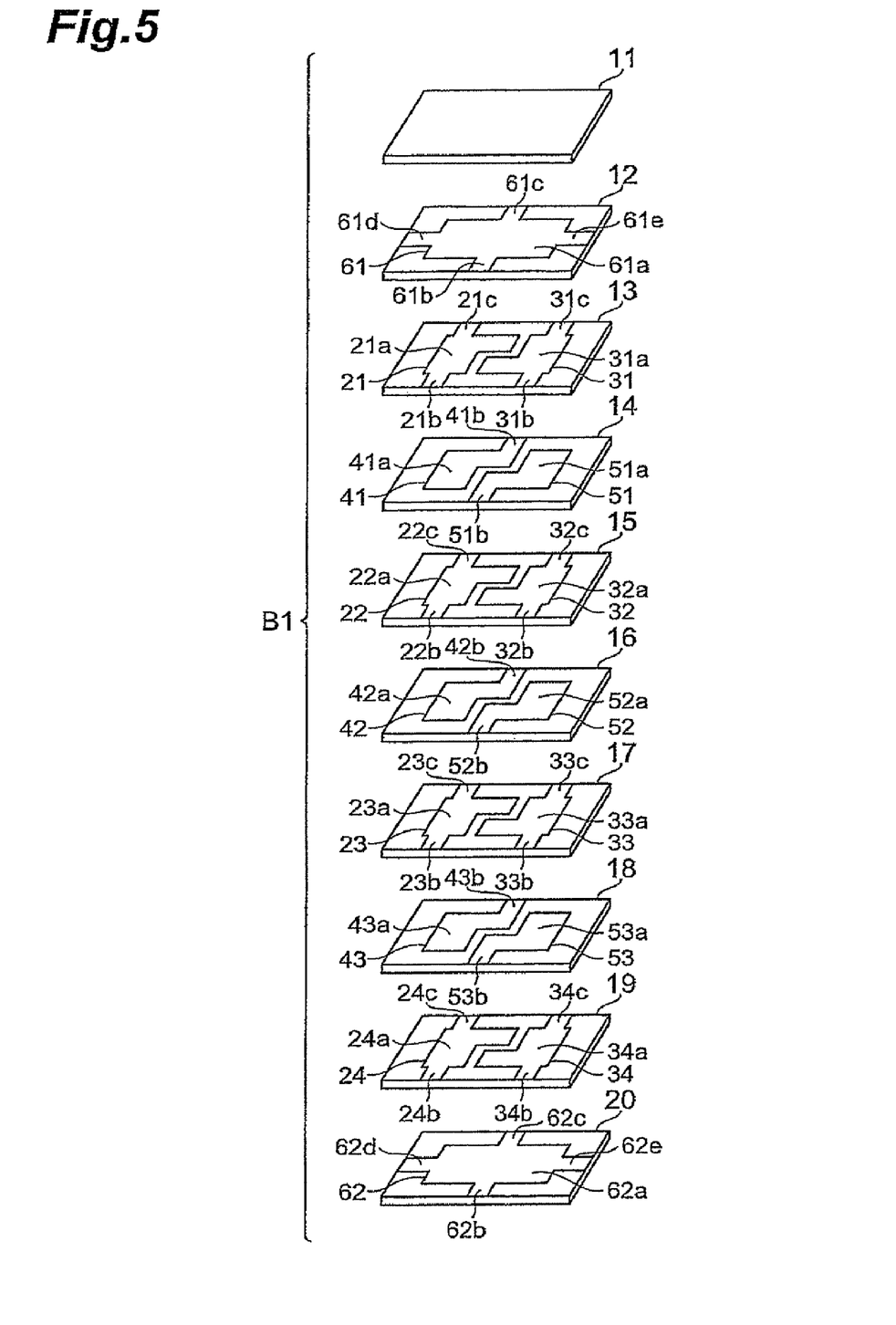
FIG. 5 is an exploded perspective view of a capacitor body included in the through-type multilayer capacitor array in accordance with the second embodiment.

The structure of the through-type multilayer capacitor array CA2 in accordance with the second embodiment will now be explained with reference to FIGS. 4 and 5. The through-type multilayer capacitor array CA2 in accordance with the second embodiment differs from the through-type multilayer capacitor array CA1 in accordance with the first embodiment in terms of the arrangement of the grounding terminal electrodes and first and second outer connecting conductors formed on the capacitor body. FIG. 4 is a perspective view of the through-type multilayer capacitor array in accordance with the second embodiment. FIG. 5 is an exploded perspective view of the capacitor body included in the through-type multilayer capacitor array in accordance with the second embodiment.

As shown in FIG. 4, the through-type multilayer capacitor array CA2 in accordance with the second embodiment comprises a capacitor body B1, and first signal terminal electrodes 1, 2, second signal terminal electrodes 3, 4, grounding terminal electrodes 5, 6, a first outer connecting conductor 7, and a second outer connecting conductor 8 which are arranged on outer surfaces of the capacitor body B1.

The first signal terminal electrodes 1, 2 are arranged one by one on the opposing first and second side faces B1c, B1d of the capacitor body B1. The first signal terminal electrode 1 is arranged on the first side face B1c of the capacitor body B1. On the other hand, the first signal terminal electrode 2 is arranged on the second side face B1d of the capacitor body B1 opposing the first side face B1c. The first signal terminal electrodes 1, 2 oppose each other in the opposing direction of the first and second side faces B1c, B1d.

The second signal terminal electrodes 3, 4 are arranged one by one on the opposing first and second side faces B1c, B1d of the capacitor body B1. The second signal terminal electrode 3 is arranged on the first side face B1c of the capacitor body B1. On the other hand, the second signal terminal electrode 4 is arranged on the second side face B1d of the capacitor body B1 opposing the first side face B1c. The second signal terminal electrodes 3, 4 oppose each other in the opposing direction of the first and second side faces B1c, B1d.

The grounding terminal electrodes 5, 6 are arranged one by one on the opposing first and second end faces B1a, B1b of the capacitor body B1. The grounding terminal electrode 5 is arranged on the first end face B1a of the capacitor body B1. On the other hand the grounding terminal electrode 6 is arranged on the second end face B1b of the capacitor body B1 opposing the first end face B1a. The grounding terminal electrodes 5, 6 oppose each other in the opposing direction of the first and second end faces B1a, B1b.

The first and second outer connecting conductors 7, 8 are arranged one by one on the opposing first and second side faces B1c, B1d of the capacitor body B1. The first outer connecting conductor 7 is arranged on the second side face B1d of the capacitor body B1. On the other hand, the second outer connecting conductor 8 is arranged on the first side face B1c of the capacitor body B1 opposing the second side face B1d. The first and second outer connecting conductors 7, 8 oppose each other in the opposing direction of the first and second side faces B1c, B1d.

The first and second signal terminal electrodes 1, 3 and second outer connecting conductor 8 are arranged on the first side face B1c of the capacitor body B1 in the order of the first signal terminal electrode 1, second outer connecting conductor 8, and second signal terminal electrode 3 in the direction from the first end face B1a to the second end face B1b. The first and second signal terminal electrodes 2, 4 and first outer connecting conductor 7 are arranged on the second side face B1d of the capacitor body B1 in the order of the first signal terminal electrode 2, first outer connecting conductor 7, and second signal terminal electrode 4 in the direction from the first end face B1a to the second end face B1b.

As shown in FIG. 5, the capacitor body B1 is constructed by laminating a plurality of (10 in this embodiment) insulator layers 11 to 20.

The first and second signal inner electrodes 21 to 24, 31 to 34 include main electrode parts 21a to 24a, 31a to 34a, respectively, each exhibiting a form in which two rectangles having different sizes are combined together. Each of the main electrode parts 21a to 24a has a larger rectangle arranged such that its longer sides are parallel to the first and second end faces B1a, B1b while a smaller rectangle is combined with the larger rectangle such as to project from the longer side on the second end face B1b side thereof toward the second end face B1b. Each of the main electrode parts 31a to 34a has a larger rectangle arranged such that its longer sides are parallel to the first and second end faces B1a, B1b while a smaller rectangle is combined with the larger rectangle such as to project from the longer side on the first end face B1a side thereof toward the second end face B1a.

The first inner electrodes 21 to 24 include lead parts 21b to 24b extending from the main electrode parts 21a to 24a to the first side face B1c and lead parts 21c to 24c extending from the main electrode parts 21a to 24a to the second side face B1d. Each of the lead parts 21b to 24b is connected to the first signal terminal electrode 1. Each of the lead parts 21c to 24c is connected to the first signal terminal electrode 2.

The second signal inner electrodes 31 to 34 include lead parts 31b to 34b extending from the main electrode parts 31a to 34a to the first side face B1c and lead parts 31c to 34c extending from the main electrode parts 31a to 34a to the second side face B1d. Each of the lead parts 31b to 34b is connected to the second signal terminal electrode 3. Each of the lead parts 31c to 34c is connected to the second signal terminal electrode 4.

The first grounding inner electrodes 41 to 43 include main electrode parts 41a to 43a and lead parts 41b to 43b extending therefrom to the second side face B1d. Each of the lead parts 41b to 43b is connected to the first outer connecting conductor 7.

The second grounding inner electrodes 51 to 53 include main electrode parts 51a to 53a and lead parts 51b to 53b extending therefrom to the first side face B1c. Each of the lead parts 51b to 53b is connected to the second outer connecting conductor 8.

The third grounding inner electrodes 61, 62 include main electrode parts 61a, 62a, lead parts 61b, 62b extending from the main electrode parts 61a, 62a to the first side face B1c, lead parts 61c, 62c extending from the main electrode parts 61a, 62a to the second side face B1d, lead parts 61d, 62d extending from the main electrode parts 61a, 62a to the first end face B1a, and lead parts 61e, 62e extending from the main electrode parts 61a, 62a to the second end face B1b. Each of the lead parts 61b, 62b is connected to the second outer connecting conductor 8. Each of the lead parts 61c, 62c is connected to the first outer connecting conductor 7. Each of the lead parts 61d, 62d is connected to the grounding terminal electrode 5. Each of the lead parts 61e, 62e is connected to the grounding terminal electrode 6.

The first and second signal inner electrodes 21, 31 are arranged at the same position in the laminating direction within the capacitor body B1. The first and second signal inner electrodes 22, 32 are arranged at the same position in the laminating direction within the capacitor body B1. The first and second signal inner electrodes 23, 33 are arranged at the same position in the laminating direction within the capacitor body B1. The first and second signal inner electrodes 24, 34 are arranged at the same position in the laminating direction within the capacitor body B1.

The first and second grounding inner electrodes 41, 51 are arranged at the same position in the laminating direction within the capacitor body B1. The first and second grounding inner electrodes 42, 52 are arranged at the same position in the laminating direction within the capacitor body B1. The first and second grounding inner electrodes 43, 53 are arranged at the same position in the laminating direction within the capacitor body B1.

The main electrode part 21a of the first signal inner electrode 21 opposes the main electrode part 61a of the third grounding inner electrode 61 through the insulator layer 12. The main electrode part 21a of the first signal inner electrode 21 also opposes the main electrode part 41a of the first grounding inner electrode 41 through the insulator layer 13.

The main electrode part 22a of the first signal inner electrode 22 opposes the main electrode part 41a of the first grounding inner electrode 41 through the insulator layer 14. The main electrode part 22a of the first signal inner electrode 22 also opposes the main electrode part 42a of the first grounding inner electrode 42 through the insulator layer 15.

The main electrode part 23a of the first signal inner electrode 23 opposes the main electrode part 42a of the first grounding inner electrode 42 through the insulator layer 16. The main electrode part 23a of the first signal inner electrode 23 also opposes the main electrode part 43a of the first grounding inner electrode 43 through the insulator layer 17.

The main electrode part 24a of the first signal inner electrode 24 opposes the main electrode part 43a of the first grounding inner electrode 43 through the insulator layer 18. The main electrode part 24a of the first signal inner electrode 24 also opposes the main electrode part 62a of the third grounding inner electrode 62 through the insulator layer 19.

The main electrode part 31a of the second signal inner electrode 31 opposes the main electrode part 61a of the third grounding inner electrode 61 through the insulator layer 12. The main electrode part 31a of the second signal inner electrode 31 also opposes the main electrode part 51a of the second grounding inner electrode 51 through the insulator layer 13.

The main electrode part 32a of the second signal inner electrode 32 opposes the main electrode part 51a of the second grounding inner electrode 51 through the insulator layer 14. The main electrode part 32a of the second signal inner electrode 32 also opposes the main electrode part 52a of the second grounding inner electrode 52 through the insulator layer 15.

The main electrode part 33a of the second signal inner electrode 33 opposes the main electrode part 52a of the second grounding inner electrode 52 through the insulator layer 16. The main electrode part 33a of the second signal inner electrode 33 also opposes the main electrode part 53a of the second grounding inner electrode 53 through the insulator layer 17.

The main electrode part 34a of the second signal inner electrode 34 opposes the main electrode part 53a of the second grounding inner electrode 53 through the insulator layer 18. The main electrode part 34a of the second signal inner electrode 34 also opposes the main electrode part 62a of the third grounding inner electrode 62 through the insulator layer 19.

Each of the first signal inner electrodes 21 to 24 is arranged on the first end face B1a side of the capacitor body B1. Each of the second signal inner electrodes 31 to 34 is arranged on the second end face B1b side of the capacitor body B1. The first and second signal inner electrodes 21 to 24, 31 to 34 are arranged in pairs aligning in the opposing direction of the first and second end faces B1a, B1b, while having no overlapping areas therebetween in the laminating direction.

Each of the first grounding inner electrodes 41 to 43 is arranged on the first end face B1a side of the capacitor body B1. Each of the second grounding inner electrodes 51 to 53 is arranged on the second end face B1b side of the capacitor body B1. The first and second grounding inner electrodes 41 to 43, 51 to 53 are arranged in paws aligning in the opposing direction of the first and second end faces B1a, B1b, while having no overlapping areas therebetween in the laminating direction.

As grounding inner electrodes, the through-type multilayer capacitor array CA2 includes the first and second grounding inner electrodes 41 to 43, 51 to 53, which are not directly connected to the grounding terminal electrodes 5, 6, and the third grounding inner electrodes 61, 62, which are directly connected to the grounding terminal electrodes 5, 6. This makes the equivalent series resistance greater in the through-type multilayer capacitor array CA2 than in a conventional through-type multilayer capacitor array in which all the grounding inner electrodes are connected to the grounding terminal electrodes through lead parts. Enhancing the equivalent series resistance prevents the impedance from dropping drastically at a resonance frequency and thus enables a broader band.

As in the foregoing, this embodiment sets the equivalent series resistance of the through-type multilayer capacitor array CA2 to a desirable value by adjusting one or both of the number and position of the third grounding inner electrodes 61, 62 connected to the grounding terminal electrodes 5, 6 through lead parts, whereby the equivalent series resistance can be controlled easily and accurately.

Even when the number of laminations of inner electrodes is increased so as to attain a greater capacitance corresponding to the demand for a larger capacity, the equivalent series resistance is kept from decreasing in the through-type multilayer capacitor array CA2.

In this embodiment, the first signal terminal electrodes 1, 2 are arranged one by one on the opposing first and second side faces B1c, B1d of the capacitor body B1 such as to oppose each other in the opposing direction of the first and second side faces B1c, B1d. The second signal terminal electrodes 3, 4 are arranged one by one on the opposing first and second side faces B1c, B1d of the capacitor body B1 such as to oppose each other in the opposing direction of the first and second side faces B1c, B1d. The grounding terminal electrodes 5, 6 are arranged one by one on the opposing first and second end faces B1a, B1b of the capacitor body B1 such as to oppose each other in the opposing direction of the first and second end faces B1a, B1b.

For example, this makes it easy to connect the first signal terminal electrodes 1, 2 to linear signal leads, the second signal terminal electrodes 3, 4 to linear signal leads, and the grounding terminal electrodes 5, 6 to linear grounding leads, whereby the through-type multilayer capacitor array CA2 can be mounted easily.

In the through-type multilayer capacitor array CA2, the respective pairs of first and second signal inner electrodes 21, 31; 22, 32; 23, 33; 24, 34 and first and second grounding inner electrodes 41, 51; 42, 52; 43, 53 are arranged at the same positions in the laminating direction within the capacitor body B1.

Therefore, in the case where the first and second signal terminal electrodes 1, 4 are connected to the input side while the first and second signal terminal electrodes 2, 3 are connected to the output side, for example, causing currents to flow simultaneously through both of a signal lead connected to the first signal terminal electrodes 1, 2 and a signal lead connected to the second signal terminal electrodes 3, 4 can direct the currents opposite from each other through the respective inner electrodes arranged at the same position in the laminating direction.

As a result, magnetic fields caused by the currents flowing through these signal inner electrodes cancel each other out in the through-type multilayer capacitor array CA2 in accordance with this embodiment, whereby the equivalent series inductance can be lowered.

Since the respective pairs of first and second signal inner electrodes 21, 31; 22, 32; 23, 33; 24, 34 and first and second grounding inner electrodes 41, 51; 42, 52; 43, 53 are arranged at the same positions in the laminating direction within the capacitor body B1, the through-type multilayer capacitor array CA2 allows the device to lower its profile.

Though preferred embodiments of the present invention are explained in detail in the foregoing, the present invention is not restricted thereto. For example, the number of laminations of insulator layers 11 to 20, first and second signal inner electrodes 21 to 24, 31 to 34, and first to third grounding inner electrodes 41 to 43, 51 to 53, 61, 62 are not limited to those shown in the above-mentioned embodiments. For example, the order of laminating the signal inner electrodes and grounding inner electrodes is not limited to those described in the above-mentioned embodiments.

Figure 6:
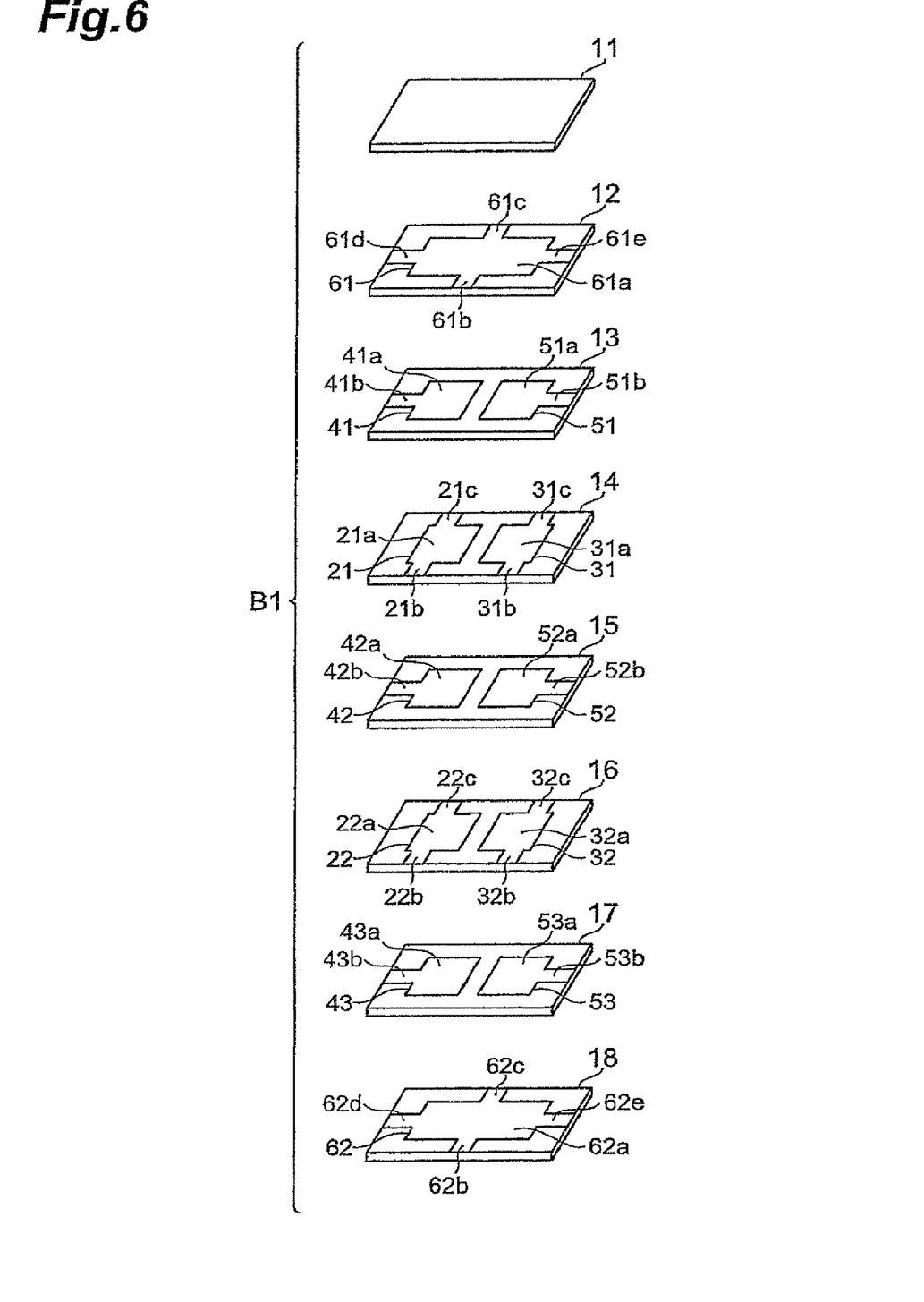
FIG. 6 is an exploded perspective view of a capacitor body included in the through-type multilayer capacitor array in accordance with a modified example of the first embodiment.

FIG. 6 shows a modified example in which the arranging order and number of signal inner electrodes and grounding inner electrodes differ from those in the through-type multilayer capacitor array CA1 in accordance with the first embodiment as a modified example thereof. In the modified example of the through-type multilayer capacitor array CA1 shown in FIG. 6, the first and second signal inner electrodes 21, 22, 31, 32 are provided two layers each. In the modified example of the through-type multilayer capacitor array CA1 shown in FIG. 6, the inner electrodes opposing the third grounding inner electrodes 61, 62 through the insulator layers 12, 17 are the first and second grounding inner electrodes 41, 43, 51, 53.

Figure 7:
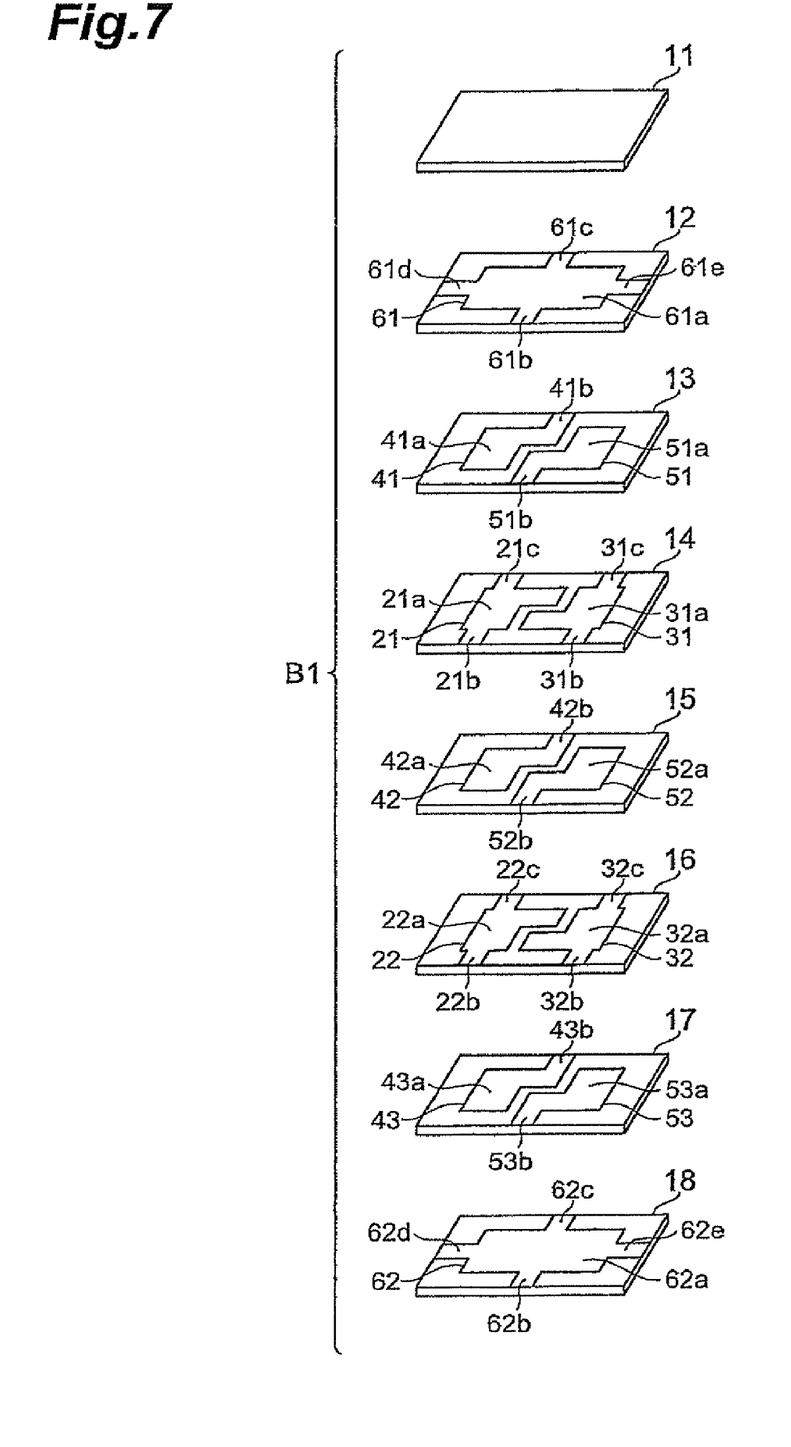
FIG. 7 is an exploded perspective view of a capacitor body included in the through-type multilayer capacitor array in accordance with a modified example of the second embodiment.

FIG. 7 shows a modified example in which the arranging order and number of signal inner electrodes and grounding inner electrodes differ from those in the through-type multilayer capacitor array CA2 in accordance with the second embodiment as a modified example thereof. In the modified example of the through-type multilayer capacitor array CA2 shown in FIG. 7, the first and second signal inner electrodes 21, 22, 31, 32 are provided two layers each. In the modified example of the through-type multilayer capacitor array CA2 shown in FIG. 7, the inner electrodes opposing the third grounding inner electrodes 61, 62 through the insulator layers 12, 17 are the first and second grounding inner electrodes 41, 43, 51, 53.

The number of first signal terminal electrodes connected to the first signal inner electrodes 21 to 24 is not limited to the numbers described in the above-mentioned embodiments and modified examples, but may be 3 or more, for example. The number of second signal terminal electrodes connected to the second signal inner electrodes 31 to 34 is not limited to the numbers described in the above-mentioned embodiments and modified examples, but may be 3 or more, for example. The number of grounding terminal electrodes connected to the third grounding inner electrodes 61, 62 is not limited to the numbers described in the above-mentioned embodiments and modified examples, but may be 3 or more, for example. The number of first outer connecting conductors is not limited to the numbers described in the above-mentioned embodiments and modified examples, but may be 2 or more, for example. The number of second outer connecting conductors is not limited to the numbers described in the above-mentioned embodiments and modified examples, but may be 2 or more, for example.

The first and second signal terminal electrodes 1 to 4, grounding terminal electrodes 5, 6, and first and second outer connecting conductors 7, 8 are not required to be arranged as described in the above-mentioned embodiments and modified examples as long as they are placed on outer surfaces of the capacitor body. For example, it is not necessary for the first signal terminal electrodes to oppose each other in the opposing direction of the first and second side faces in the capacitor body. For example, it is not necessary for the second signal terminal electrodes to oppose each other in the opposing direction of the first and second side faces in the capacitor body. For example, it is not necessary for the grounding terminal electrodes to oppose each other in the opposing direction of the first and second side faces or the opposing direction of the first and second end faces in the capacitor body. For example, it is not necessary for the first and second outer connecting conductors to oppose each other in the opposing direction of the first and second side faces or the opposing direction of the first and second end faces in the capacitor body.

The forms of the first and second signal inner electrodes 21 to 24, 31 to 34 and first to third grounding inner electrodes 41 to 43, 51 to 53, 61, 62 are not limited to those described in the above-mentioned embodiments and modified examples.

The positions of the first signal inner electrodes 21 to 24 in the laminating direction are not limited to those described in the above-mentioned embodiments and modified examples. The positions of the second signal inner electrodes 31 to 34 in the laminating direction are not limited to those described in the above-mentioned embodiments and modified examples.

For example, any of a plurality of first signal inner electrodes may be arranged such as to oppose the first grounding inner electrode with at least one of a plurality of insulator layers in between, while any of a plurality of second signal inner electrodes may be arranged such as to oppose the second grounding inner electrode with at least one of the plurality of insulator layers in between. In this case, the insulator layer positioned between the first signal inner electrode and first grounding inner electrode may be either identical to or different from that positioned between the second signal inner electrode and second grounding inner electrode.

For example, any of a plurality of first signal inner electrodes may be arranged such as to oppose the first grounding inner electrode with at least one of a plurality of insulator layers in between, while any of, a plurality of second signal inner electrodes may be arranged such as to oppose the third grounding inner electrode with at least one of the plurality of insulator layers in between. In this case, the insulator layer positioned between the first signal inner electrode and first grounding inner electrode may be either identical to or different from that positioned between the second signal inner electrode and third grounding inner electrode.

For example, any of a plurality of first signal inner electrodes may be arranged such as to oppose the third grounding inner electrode with at least one of a plurality of insulator layers in between, while any of a plurality of second signal inner electrodes may be arranged such as to oppose the second grounding inner electrode with at least one of the plurality of insulator layers in between. In this case, the insulator layer positioned between the first signal inner electrode and third grounding inner electrode may be either identical to or different from that positioned between the second signal inner electrode and second grounding inner electrode.

For example, any of a plurality of first signal inner electrodes may be arranged such as to oppose the third grounding inner electrode with at least one of a plurality of insulator layers in between, while any of a plurality of second signal inner electrodes may be arranged such as to oppose the third grounding inner electrode with at least one of the plurality of insulator layers in between. In this case, the insulator layer positioned between the first signal inner electrode and third grounding inner electrode may be either identical to or different from that positioned between the second signal inner electrode and third grounding inner electrode.

The number of insulator layers held between the first to third grounding inner electrodes 41 to 43, 51 to 53, 61, 62 and their opposing first or second signal inner electrodes 21 to 24, 31 to 34 is not limited to the numbers described in the above-mentioned embodiments and modified examples, but may be 2 or more, for example.

The respective pairs of first and second signal inner electrodes 21, 31; 22, 32; 23, 33; 24, 34 are not required to be arranged at the same position but may be located at different positions in the laminating direction with the capacitor body B1. The respective pairs of first and second grounding inner electrodes 41, 51; 42, 52; 43, 53 are not required to be arranged at the same position but may be located at different positions in the laminating direction within the capacitor body B1.

In the capacitor body of the multilayer capacitor array in accordance with the present invention, insulator layers may be laminated additionally or alternately with the inner electrodes.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array comprising:
a capacitor body;
at least two first signal terminal electrodes arranged on an outer surface of the capacitor body;
at least two second signal terminal electrodes arranged on the outer surface of the capacitor body;
at least two grounding terminal electrodes arranged on the outer surface of the capacitor body;
at least one first outer connecting conductor arranged on the outer surface of the capacitor body; and
at least one second outer connecting conductor arranged on the outer surface of the capacitor body;
wherein the capacitor body includes a plurality of laminated insulator layers, a first signal inner electrode, a second signal inner electrode, a first grounding inner electrode, a second grounding inner electrode, and a third grounding inner electrode;
wherein the first signal inner electrode is arranged so as to oppose the first or third grounding inner electrode with at least one of the plurality of insulator layers in between;
wherein the second signal inner electrode is arranged so as to oppose the second or third grounding inner electrode with at least one of the plurality of insulator layers in between;
wherein the first signal inner electrode is connected to the at least two first signal terminal electrodes;
wherein the second signal inner electrode is connected to the at least two second signal terminal electrodes;
wherein the first grounding inner electrode is connected to the at least one first outer connecting conductor;
wherein the second grounding inner electrode is connected to the at least one second outer connecting conductor;
wherein the third grounding inner electrode is connected to the at least two grounding terminal electrodes, the at least one first outer connecting conductor, and the at least one second outer connecting conductor;

wherein the third grounding inner electrode is directly connected to the at least two grounding terminal electrodes;

wherein the first grounding inner electrode is not directly connected to the at least two grounding terminal electrodes and is connected only to the third grounding inner electrode through the at least one first outer connecting conductor; and wherein the second grounding inner electrode is not directly connected to the at least two grounding terminal electrodes and is connected only to the third grounding inner electrode through the at least one second outer connecting conductor.

2. A multilayer capacitor array according to claim 1, wherein the at least two first signal terminal electrodes are arranged at least one by one on a pair of opposing side faces of the capacitor body;

wherein the at least two second signal terminal electrodes are arranged at least one by one on the pair of opposing side faces of the capacitor body; and wherein the at least two grounding terminal electrodes are arranged at least one by one on a pair of opposing side faces of the capacitor body.

3. A multilayer capacitor array according to claim 1, wherein the first and second signal inner electrodes are arranged at the same position in the laminating direction of the insulator layers within the capacitor body; and wherein the first and second grounding inner electrodes are arranged at the same position in the laminating direction of the insulator layers within the capacitor body.

* * * * *